United States Patent

[11] 3,628,122

| [72] | Inventor | Arnold Rodewald<br>Riehen near Basel, Switzerland |
|---|---|---|
| [21] | Appl. No. | 824,124 |
| [22] | Filed | May 13, 1969 |
| [45] | Patented | Dec. 14, 1971 |
| [73] | Assignee | Emil Haefely & Cie. AG<br>Basel, Switzerland |
| [32] | Priority | May 16, 1968 |
| [33] | | Switzerland |
| [31] | | 7239/68 |

[54] MULTISTAGE MARX IMPULSE GENERATOR CIRCUIT COMPRISING CHARGING SWITCH AND PROTECTIVE RESISTORS
2 Claims, 4 Drawing Figs.

| [52] | U.S. Cl. | 320/1 |
|---|---|---|
| [51] | Int. Cl. | H02m 7/32 |
| [50] | Field of Search | 320/1 |

[56] References Cited
UNITED STATES PATENTS

| 2,853,606 | 9/1958 | Weill et al. | 320/1 X |
|---|---|---|---|
| 2,927,224 | 3/1960 | Ruehlemann | 320/1 X |
| 3,073,973 | 1/1963 | Rodewald | 320/1 X |
| 3,242,388 | 3/1966 | Tellerman | 320/1 X |

*Primary Examiner*—Stanley M. Urynowicz, Jr.
*Attorney*—Kurt Kelman

ABSTRACT: A multistage Marx impulse generator circuit to which protective resistors are connected in series or in parallel with charging switches. The ohmic value of the protective resistors are chosen so that in the case of premature flashover across a spark gap, the energy stored in the generator can be absorbed by the protective resistors.

MULTISTAGE MARX IMPULSE GENERATOR CIRCUIT COMPRISING CHARGING SWITCH AND PROTECTIVE RESISTORS

For charging a multistage Marx impulse generator the capacitors connected in parallel must be charged through a charging rectifier. In a conventional arrangement the capacitors are connected in parallel by a charging switch comprising a plurality of simultaneously operating contact elements. When the capacitors have been charged to the desired voltage all the contact elements of the charging switch are simultaneously opened and the spark gaps between the stages in the impulse generator circuit then form the series connection between the several capacitors. Under the conditions of a test the possibility cannot be excluded that flashover may occur prematurely across one of the gaps when the elements of the charging switch are still closed, and that no flashover will occur at the other gaps. The energy already stored in the stages that have not yet fired must then discharge across this single spark gap. The result is a thermal load that is considerably higher than in normal operation being imposed on the resistors in the neighborhood of the stage where flashover has developed. This load may become extremely high if, as is required for some impulse voltage tests, the stages of the impulse generator circuit are connected in parallel by permanent connections in groups for the purpose of providing a higher impulsing capacitance at the expense of a reduced peak voltage.

Figure 1:
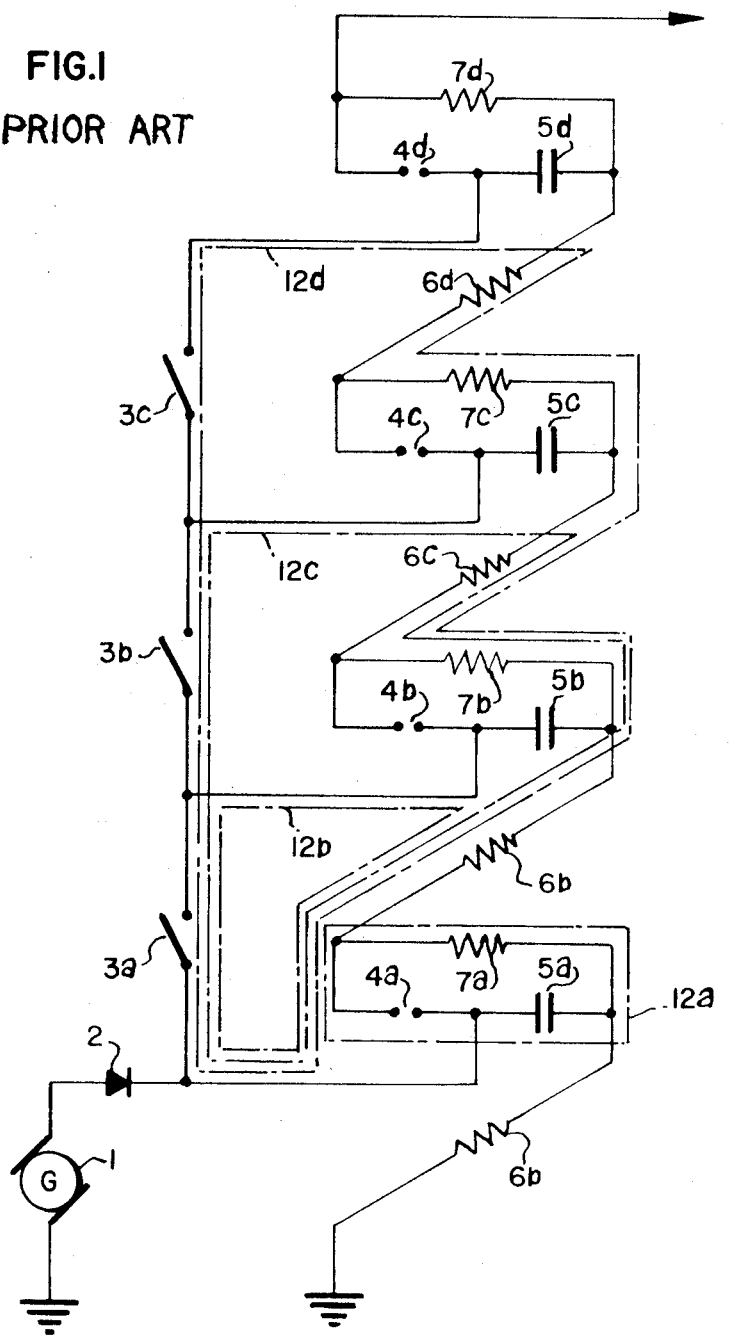
FIG. 1 represents a prior art four-stage impulse generator circuit.

This may be explained in greater detail by reference to an example. FIG. 1 represents a four-stage impulse generator circuit. In this circuit impulse voltage capacitors 5a–5d are charged from an alternating current source 1 through a rectifier 2, a charging switch comprising elements 3a, 3b and 3c, damping resistors 6a–6d and discharging resistors 7a–7d. If now a premature flashover of the above described kind should occur across say the spark gap 4a, then the load on the two resistors 6b and 7b will be very high. This will be readily understood by tracing out the paths of the discharging currents 12a–12 which are indicated by dotted lines in FIG. 1 and noting their bunching through the resistors 6b and 7b.

Figure 2:
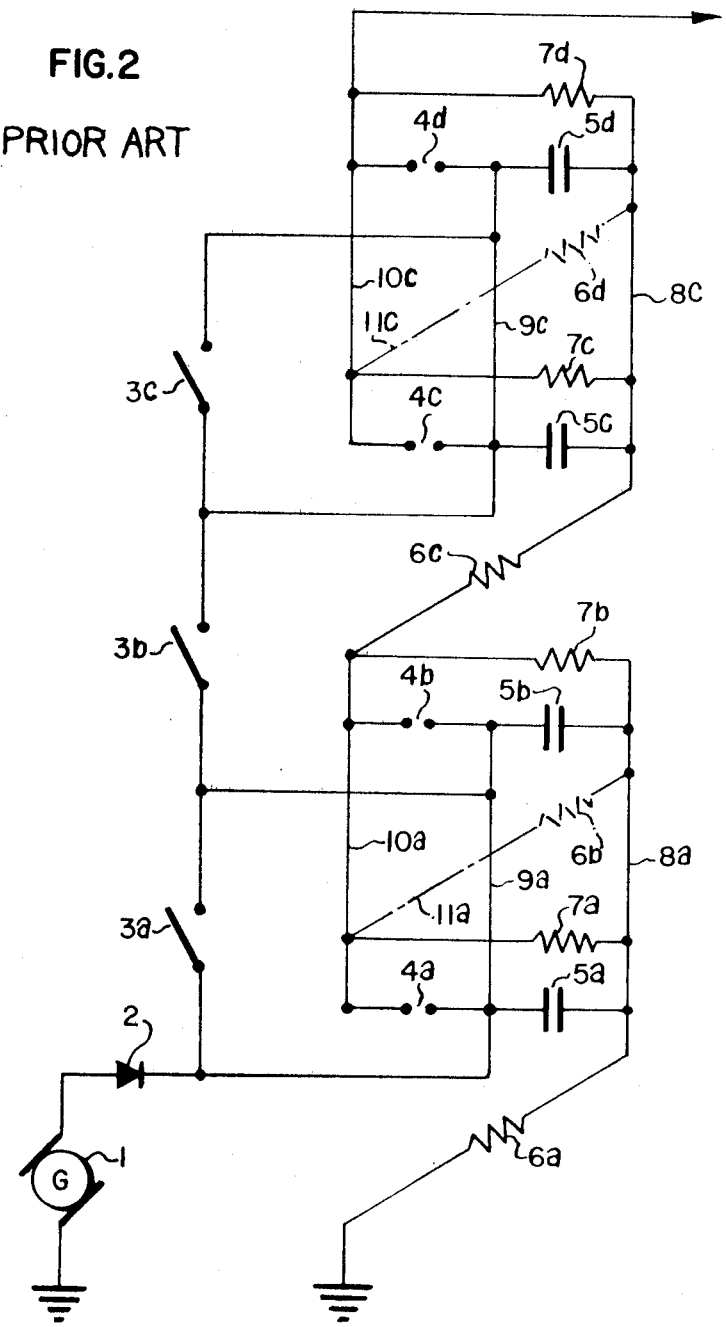
FIG. 2 represents another form of prior art impulse generator circuit.

The overloads which arise in individual resistors when such an occurrence takes place are even more pronounced in an impulse generator circuit of the kind illustrated in FIG. 2. This Figure shows a circuit which has been formed from an originally four-stage impulse generator circuit comprising capacitors 5a–5d, damping resistors 6a–6d, discharging resistors 7a–7d and a charging switch with simultaneously operating contact elements 3a–3c by conversion into a two-stage impulse generator by adding the electrical connections 8a, 9a, 10a; 8c, 9c, 10c and disconnecting the dashed connections 11a and 11c. This latter step involves the inactivation of the resistors 6b and 6d in the circuit, which are also shown in dashed lines. Consequently the stages identified by the indices a and b form a first group and the stages identified by the indices c and d a second group in a two-stage impulse generator circuit. Now, assuming that flashover takes place across one of the spark gaps 4a or 4b in the first group, whereas there is no flashover across the gaps 4c or 4d in the second group, then the energy stored in the first group will pass through the discharging resistors 7a and 7b and the energy stored in the second group will pass through the damping resistor 6c and the discharging resistors 7a and 7b. Since the resistor 6c will usually have a much lower ohmic resistance than the resistors 7a or 7b, the energy of the second group will principally flow through the discharging resistors 7a and 7b.

Naturally such premature flashovers may occur in any stage of the impulse generator circuit. It has therefore hitherto been necessary so to design the resistors in each stage of the generator circuit that flashover across any individual spark gap in any stage may take place without consequent damage. To prevent the resistors from burning out, their thermal capacity must be sufficient. Since these resistors in common with the capacitance of the impulse generator circuit and of the test piece decide the waveform of the impulse voltage, they must also have a low inductance, a low-temperature coefficient and a linear characteristic current-voltage curve. Particularly in high-energy impulse generator circuits these requirements can be met only with the aid of expensive resistor designs.

The impulse generator circuit according to the present invention eliminates this drawback.

The proposed multistage Marx impulse generator circuit comprising a charging switch having a plurality of simultaneously operating contact elements for charging the impulse capacitors, wherein closing of the contact elements connects the poles of the impulse capacitors in parallel to a DC voltage source and the contact elements are reopened when the impulse capacitors have attained the desired charge, is characterized in that a protective resistor of substantially higher ohmic resistance than that of the damping and discharging resistors is connected in series with each element of the charging switch or between one pole of the elements of the charging switch and the pole on the rectifier side of the associated impulse capacitor.

In a first embodiment of the invention a protective resistor is connected in series with each element of the charging switch. Since at the end of the charging process the elements of the charging switch are opened, this protective resistor does not affect the voltage waveform of the impulse generator so that low inductances, low-temperature coefficient and a linear characteristic current-voltage curve are no longer relevant parameters. It is quite sufficient to provide this resistor with an adequate thermal capacity to permit it to cope with the possibility of a premature flashover across a single spark gap. Preferably the ohmic value of these protective resistors should be orders of magnitude higher than that of the damping and discharging resistors so that in the case of a premature flashover the energy stored in the generator can be substantially completely absorbed by the protective resistors. This enables the damping and discharging resistors to be more cheaply produced, because their thermal capacities and their ability to dissipate the generated heat into the ambient atmosphere need not be higher than is necessary for dealing with the normal operating conditions of the impulse generator circuit.

Figure 3:
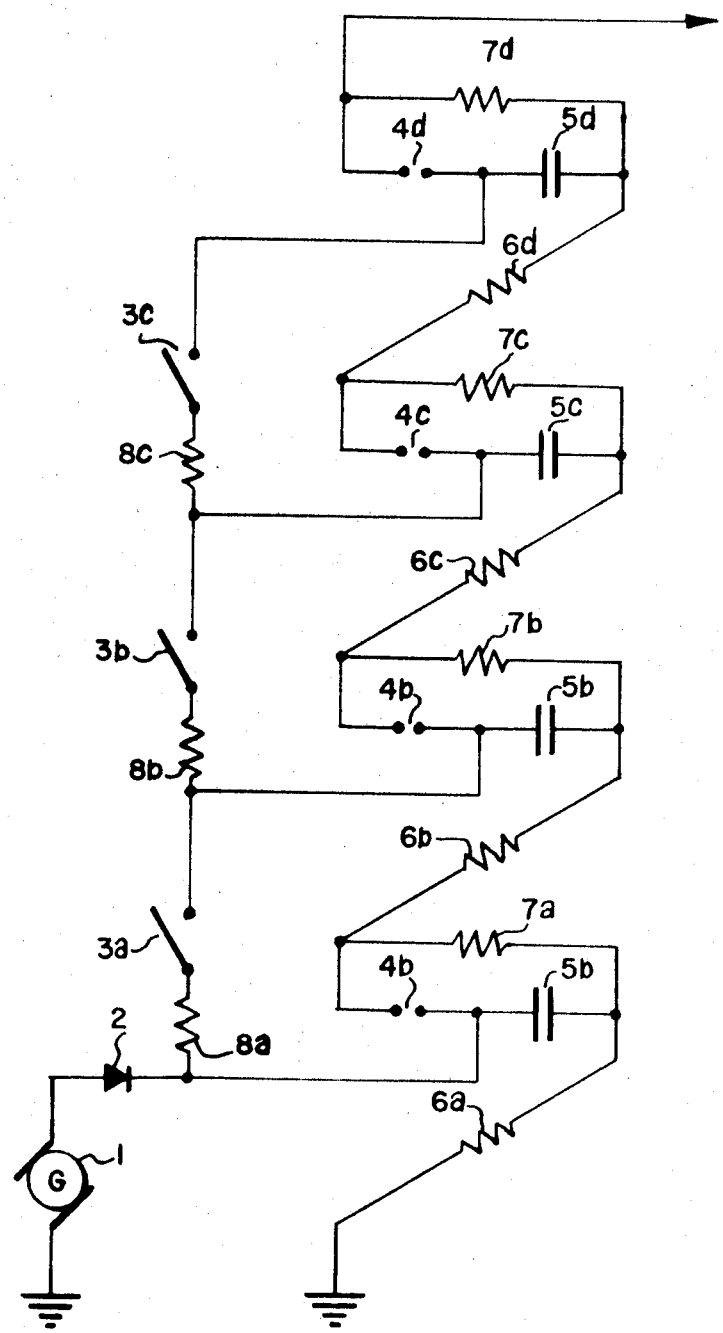
FIG. 3 represents a first embodiment of the invention.

In FIG. 3 this first embodiment is exemplified in diagram form. The reference numbers for identifying the several components are the same as those used in FIG. 1. The protective resistors connected in series with the elements 3a to 3c of the charging switch are indicated by reference numerals 8a, 8b and 8c.

Figure 4:
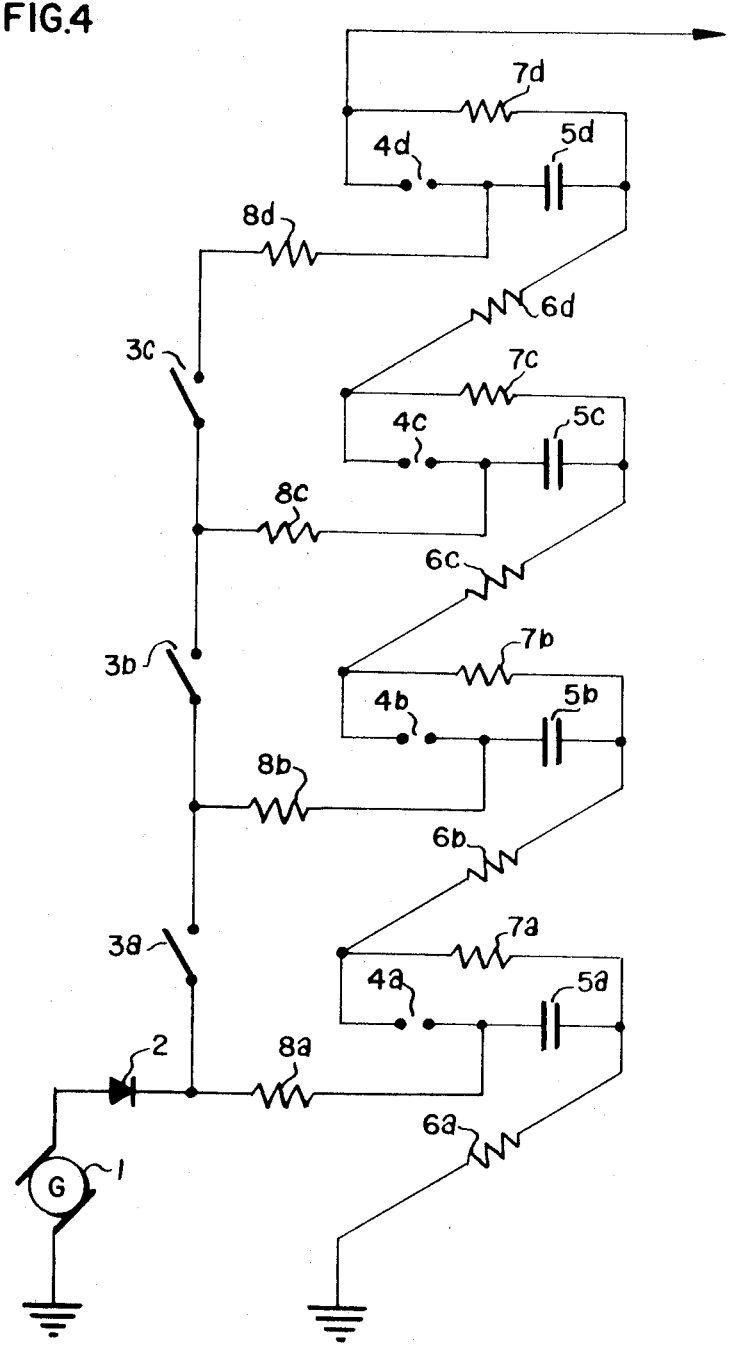
FIG. 4 represents a second embodiment of the invention.

A second embodiment of the invention is shown in FIG. 4 in which protective resistors 8a to 8d are interposed between one pole of the elements of the charging resistor and the pole on the rectifier side of the associated impulse capacitor. The resistances of the protective resistors should in practice be selected by reference to the same rules that also applied to the first embodiment of the invention.

The reference numerals indicating the several components are again the same as in FIG. 3.

What is claimed is:

1. A multistage Marx impulse generator circuit comprising:
   1. a plurality of stages, each stage including the series connection of an impulse capacitor and a spark gap and further including a discharge resistor connected in parallel across said series connection;
   2. a charging switch having a plurality of ganged switch contacts simultaneously operating when said switch is operated, each switch contact connecting the juncture between the spark gap and the impulse capacitor in one stage with the corresponding point in the next succeeding stage;

3. a plurality of damping resistors interconnecting the juncture of the spark gap and the discharging resistor in one stage with the juncture of the impulse capacitor and the discharging resistor in the next succeeding stage, the first one of said plurality of damping resistors being connected to ground;

4. said switch contacts, when closed, connecting the plates of said impulse capacitors in parallel to a source of DC potential having one terminal thereof connected to ground, said switch contacts being simultaneously opened when the desired charging voltage has been attained;

5. a plurality of protective resistors each having a resistance which exceeds that of said damping and said discharging resistors, said protective resistors being serially connected with said switch contacts between said switch contacts and the juncture of the impulse capacitor and spark gap in each stage whereby thermal damage to said discharging and damping resistors is inhibited in the event one or more of said spark gaps prematurely breaks down, prior to the opening of said switch elements.

2. A multistage Marx impulse generator according to claim 1, wherein said protective resistors are connected in the circuit connecting the juncture of the spark gap and the impulse capacitor of each stage to the switch element associated with that stage.

* * * * *